Figure 1:
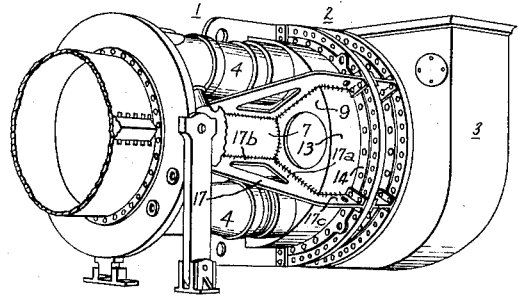

April 1, 1952  B. O. BUCKLAND ET AL  2,591,399
POWER PLANT FRAME STRUCTURE HAVING AIR-COOLING MEANS
FOR TURBINE ROTORS AND EXHAUST FRAME STRUTS
Original Filed June 11, 1947  2 SHEETS—SHEET 1

Inventors:
Bruce O. Buckland,
Alan Howard,
by Ernest C. Britton
Their Attorney.

Inventors:
Bruce O. Buckland,
Alan Howard,
by Ernest C. Britton
Their Attorney.

Patented Apr. 1, 1952

2,591,399

UNITED STATES PATENT OFFICE 2,591,399

POWER PLANT FRAME STRUCTURE HAVING AIR-COOLING MEANS FOR TURBINE ROTORS AND EXHAUST FRAME STRUTS

Bruce O. Buckland and Alan Howard, Schenectady, N. Y., assignors to General Electric Company, a corporation of New York Original application June 11, 1947, Serial No. 754,002. Divided and this application January 20, 1951, Serial No. 206,966

5 Claims. (Cl. 60—39.32)

This invention relates to gas turbine powerplants, particularly to a novel frame structure for the turbine of such a powerplant, having special means for cooling the frame components so as to facilitate maintenance of correct alignment of the respective bearings and minimum clearances at the shaft packings and turbine bucket tips.

The present application is a division of a copending application, Serial No. 754,002, filed June 11, 1947, in the names of Alan Howard, Chester S. Rice, and Bruce O. Buckland, and assigned to the same assignee as the present application.

In the design of gas turbine powerplants, a major consideration is the provision of arrangements for permitting free differential thermal expansion between relative parts without producing undesirable deformation of the rotor or material alteration of the clearances between the rotor and various stationary parts. Because of the extremely high temperatures to which certain parts must necessarily be subjected, it is necessary to use special high temperature resisting materials, such as various stainless steels. These generally have a coefficient of expansion in the neighborhood of twice that of ordinary mild carbon steel, with the result that utilization of such materials magnifies the problems resulting from differential thermal expansion. Furthermore, in a powerplant designed for applications where the load must be frequently and materially altered, as for instance in marine installations and locomotives, it is found that differential thermal expansion problems are intensified still further by differences in the size and mass of various related parts, and differences in the resistance of the heat flow paths to them from the source of heat, with accompanying differences in the rate of change of dimension when temperatures change rapidly. The resulting differential thermal expansions introduce special problems when the rotor of the machine is of sufficient length and mass as to require a plurality of axially spaced bearings. In such a machine, it is absolutely necessary, in order to avoid vibration troubles and abnormal bearing loads and shaft stresses, that the frame structure be arranged so differential thermal expansion will not have the effect of impairing the bearing alignment. The problems become even more difficult when it is necessary to provide a bearing at the exhaust side of the turbine rotor, so that the members for supporting this bearing must go either through or around the turbine exhaust casing.

Accordingly, the object of the present invention is to provide an improved frame structure for a high temperature gas turbine having special means for cooling the frame components so as to prevent bearing misalignment due to differential thermal expansion between the respective bearing supporting components.

Another object is to provide a turbine structure in which the hot gases are contained in a passage formed partly by segmental pieces of stainless steel, so arranged as to transmit a minimum of heat to the cooled supporting structure so that the supporting structure may be fabricated of low carbon steels. Thus, the use of costly high temperature steel alloys is minimized.

A further object is to provide gas turbine structure in which the hot components, that is, the comparatively thin sheet metal walls which define the hot gas passages, are arranged so as to be free to flex under the influence of temperature changes, such flexing preventing the transmission of excessive deforming forces to the frame members.

A still further object is to provide a cooled turbine frame structure of the type described in which spent cooling fluid is used to cool and pressurize certain turbine shaft seals and the space adjacent the turbine rotor so as to prevent the entrance of hot motive fluid into that space.

Figure 3:
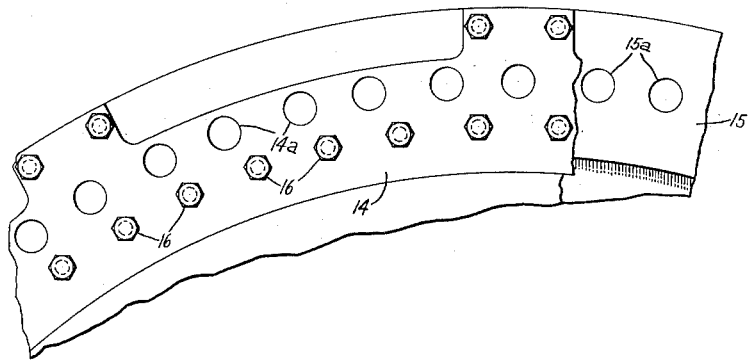
Figure 2:
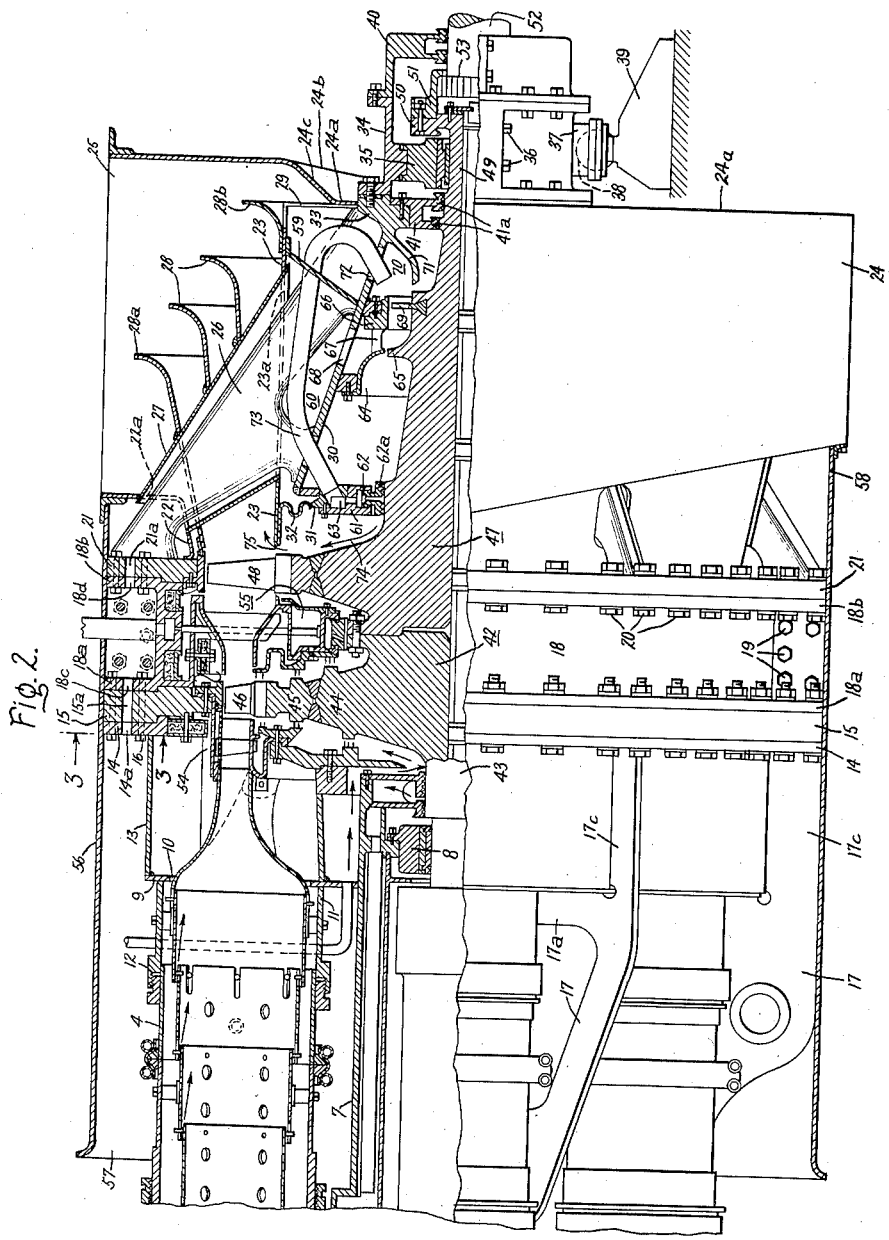

Other objects and advantages will become apparent from the following description taken in connection with the accompanying drawings, in which Fig. 1 is a perspective view of the combustion and turbine sections of a gas turbine powerplant incorporating the invention with one combustor removed; Fig. 2 is a detailed view in partial section showing the turbine frame structure to which the present invention particularly relates; and Fig. 3 is a partial sectional view at the plane 3—3 in Fig. 2, showing a detail of the cooled frame structure.

Generally, the present invention is practiced by providing a plurality of main frame rings surrounding the respective bucket-wheels of the turbine rotor and connected together in axially spaced relation by cylindrical casing sections, with a system of axially and radially extending struts extending from the respective frame rings so as to fix these rings in space relative to the bearing housing members. One set of struts passes between respective pairs of the circumferentially spaced cylindrical type combustion chambers, while the other set of struts passes through the annular turbine exhaust casing. Special cooling means include a fan rotor carried on the turbine shaft and adapted to draw cooling air through holes in the main frame rings and through cooling shrouds surrounding each of the struts which passes through the turbine exhaust casing so that the high, and at times circumferentially uneven, temperature of the exhaust fluid will not affect adversely the length and shape of the struts.

Referring now more particularly to Fig. 1, the powerplant includes a combustion system indicated generally at 1, a turbine assembly at 2, and an exhaust casing at 3.

As will be seen in Fig. 1, the combustion system comprises a plurality of circumferentially spaced similar combustion chambers or "combustors" 4, each of generally cylindrical configuration and spaced circumferentially around the axis of the powerplant. Only one of the combustors is shown in section (Fig. 2), and the structural details thereof will not be described herein since they comprise the subject matter of a copending application, Serial No. 62,333, filed November 27, 1948, in the name of Bruce O. Buckland, now Patent No. 2,547,619, and assigned to the same assignee as the present application.

As will be seen in Fig. 2, the combustors 4 are spaced circumferentially around and radially away from a substantially cylindrical frame member 7. At its right-hand end, the frame cylinder member 7 carries a journal bearing 8. Welded to the cylindrical frame member 7 adjacent the journal bearing 8 is a radially extending annular plate 9, which has a circumferential row of openings 10 around each of which is welded one end of a short cylinder 11 having at the other end a flange 12 adapted to support the turbine end of the outer combustor casing. To the outer circumference of the transverse plate 9 is welded an axially extending cylinder 13, which entirely surrounds the transition end of the combustion system. At its right-hand end, cylinder 13 is welded to a continuous main frame ring 14, to which is secured the main frame ring 15, for instance by a plurality of threaded fastenings 16, in a manner which will be more apparent from Fig. 3.

While the transverse plate 9 and the axially extending cylinder 13 help to support the frame ring 14 from the cylinder 7, a principal portion of the support between these members is provided by a plurality of circumferentially spaced diagonally extending ribs or struts 17, there being one such strut between each pair of adjacent combustors. At the left-hand radially inner end, each strut 17 is welded to the left-hand end of the frame cylinder 7 in a manner which will be understood from a comparison of Figs. 1 and 2. At an intermediate portion, each strut 17 is provided with an inwardly extending portion 17a (see Fig. 1) welded to the transverse plate 9 and an axially extending portion 17b welded to the outer circumference of the frame cylinder member 7. At its radially outer end, each strut 17 is provided with an axially extending portion 17c welded to the outer surface of frame cylinder 13 and the adjacent radial face of frame ring 14. Thus, it will be seen that the members 7, 17, 9, 13 and 14 form an extremely rigid integral frame serving to hold the journal bearing 8 in fixed space relation to the main frame ring 15.

Secured to the main ring 15 by bolts 16 is an interstage turbine casing indicated generally at 18 in Fig. 2. This casing is not an integral annular member, but is formed in two halves divided along a vertical plane through the axis of the turbine and secured together by a plurality of threaded fastenings 19. At its downstream side, interstage casing 18 is provided with a second radially extending flange 18b secured by bolts 20 to a second integral main frame ring 21. Bolted to the exterior face of ring 21, adjacent the inner periphery thereof, is an exhaust casing fabricated of comparatively thin flexible sheets and having a somewhat conical external wall 22, a cylindrical inner wall 23, and a discharge casing 24 with a flanged outlet opening 25. The discharge casing is provided with a flat end wall plate 24a which extends upwardly to somewhat above the center-line of the powerplant and then flares outwardly, as indicated at 24b in Fig. 2. Plate 24a is normal to the axis of the powerplant, and the central portion thereof is connected with the outwardly flaring portion 24b by a central dished portion 24c.

Projecting diagonally across the annular passage defined by exhaust casing walls 22, 23 are a plurality of circumferentially spaced, radially and axially extending struts or ribs 26. When there are six combustors, it is convenient to use six of these struts, the same number as there are of the struts 17. At its radially outer end, each strut 26 is secured, as by bolting or welding, to the main frame ring 21. Each strut projects through an opening 22a in the outer exhaust casing wall 22 and through a second opening 23a in the inner exhaust casing wall 23. Surrounding each strut 26 in spaced relation thereto is a cooling air shroud 27, which projects through the respective openings 22a, 23a and is welded to the peripheries thereof. These shrouds 27 form a cooling air path surrounding each strut 26, as described more particularly hereinafter, and also serve to support the inner exhaust casing wall 23 from the outer exhaust casing wall 22. Welded to the shrouds 27 and arranged within the turbine exhaust passage are a plurality of guide vanes 28 adapted to direct the turbine discharge fluid smoothly outward into the exhaust casing 24. The outermost vane 28a extends all the way to the vicinity of the main frame ring 21 and is sealed thereto by any suitable means. Thus, it will be seen that member 28a forms the outer wall of the passage for the turbine discharge fluid. The innermost guide vane 28b is secured to the outer circumference of the cylindrical wall 23. The walls 23 and 24a are provided with openings at 29, which openings form a discharge port for cooling air, as described hereinafter. As will be apparent from Fig. 2, the turning vane 28b forms one wall of this cooling air outlet.

At the radially inner ends, the struts 26 are welded to an integral conical frame member 30. At its outer end, adjacent the last-stage turbine bucket-wheel, frame member 30 is provided with an inwardly extending flange portion 31 which is connected by a convoluted annular flexible member 32 to the adjacent edge of the inner casing wall 23. At its exterior end, the conical frame member 30 is provided with a heavy flange member 33, to which is secured the housing 34 of the exhaust end journal bearing 35. Bearing housing 34 is for convenience split into two halves along a horizontal plane and secured together by the threaded fastenings 36. The lower half of casing 34 is provided with a projecting boss 37 which forms a socket for receiving a ball member 38 secured to an end support pedestal 39. It will be understood that the ball support arrangement 37, 38, 39 provides one fixed support point for the powerplant. The end of bearing housing 34 is closed by a cap member 40, which may also be formed in two halves bolted together at the horizontal center-line. Also secured to the end ring 33 of frame member 30 is a labyrinth casing 41 having labyrinth seal members 41a adapted to cooperate with portions of the turbine rotor for preventing the flow of oil vapors from bearing 35 to the left into the cooling air passages described hereinafter.

It is desired to direct attention to the fact that this entire frame structure is designed throughout so that the load-supporting and bearing-aligning members are maintained at a comparatively low temperature so that ordinary, comparatively inexpensive, easily worked and readily available steel alloys may be used for the frame and casing members. The use of mild steel for the principal frame members results in the further very great advantage that differential thermal expansion is reduced by reason of its lower coefficient of thermal expansion, as compared with high temperature alloys such as the "stainless" steels.

Having described in some detail the casing and frame structure for the turbine, it will be observed that the rotor comprises a first-stage turbine bucket-wheel, indicated generally at 42, having a hub portion formed integral with a shaft extension 43 and a first radially extending web portion 44, to which is welded a circumferential rim portion 45. This rim portion carries a circumferential row of blades or buckets 46, which may be secured to the rim 45 by any suitable means, such as dove-tails, welding, etc. The buckets shown are of the "shroudless" or open-ended type. This bucket-wheel construction is the so-called "composite bucket-wheel" more fully described in Patent 2,432,315, issued to Alan Howard on December 9, 1947, and assigned to the same assignee as the present application.

The second-stage turbine bucket-wheel, indicated generally at 47 is also of this composite construction and has a circumferential row of shroudless buckets 48. Formed integral with the bucket-wheel 47 is an axially extending shaft end portion 49, which serves a number of purposes. The end of shaft portion 49 is supported in the journal bearing 35, at the exterior side of which it is provided with a coupling flange 50, to which is bolted an internally splined coupling member 51. The input shaft 52 of a suitable load device (not shown) extends through the bearing end cap 49 and is provided with splines 53 engaging the cooperating splines of the coupling member 51. Further details of the turbine rotor construction are not material to the understanding of the present invention, and therefore will not be described in further detail here, such details being covered by the copending application of Bruce O. Buckland and Chester S. Rice, Serial No. 208,961, filed on February 1, 1951 and assigned to the same assignee as the present application.

The nozzle ring assembly for directing hot motive fluid into the first-stage bucket-wheel 46 is indicated generally at 54, and the interstage diaphragm assembly defining the nozzle ring for directing motive fluid into the second-stage buckets 48 is indicated generally at 55, in Fig. 2. The details of these assemblies are not described particularly herein since they are covered by the copending application of Alan Howard, Serial No. 107,306, filed on July 28, 1949, and assigned to the same assignee as the present application. It is of interest to note here that the portions of these assemblies which define the walls of the high temperature motive fluid flow path are flexibly supported or mounted so as to be free to shift relative to the main supporting frame members, the latter being maintained cool so as to retain their shape and dimensions.

The special arrangements for cooling the casing and frame structure will now be described.

The main frame rings 14, 15, 18a, 18b, and 21 are provided with cooperating holes 14a, 15a, 18c, 18d, and 21a. These holes define axial cooling air passages spaced rather closely circumferentially around the main frame rings, as may be seen in Fig. 3.

It will be seen in Fig. 2 that the cylindrical frame member 15 and the interstage casing 18 cooperate with an enclosing air cooling shroud 56 to define a cooling air passage having an annular inlet at 57. This cylindrical cooling shroud 56 closely surrounds the main frame rings 14, 15, 18a, 18b, and 21 and has a right-hand end portion 58 sealingly engaging the exhaust casing 24.

As will also be seen in Fig. 2, the inner cylindrical wall 23 of the exhaust casing, in combination with the flexible ring 32, the inner conical frame member 30 and annular baffle 59 cooperate to define an annular space 60 communicating with the cooling air passages defined between the cooling shrouds 27 and the support struts 26. These air passages are in communication by way of the openings 22a in the exhaust casing with the annular space contained within the cooling air shroud 56. Cooling air is drawn into the shroud inlet 57 through the cooling air holes in the frame rings and through the cooling shrouds 27 into the chamber 60 by a cooling fan described more particularly hereinafter.

At the left-hand end of frame member 30 in Fig. 2, the ring 31 carries a casing 61 which supports a labyrinth packing member 62 and defines cooling and sealing air passages 63 which furnish cooling fluid to a mid-point of the labyrinth seal 62a. Bolted to an intermediate portion of frame member 30 is a curved annular shroud 64, which has an inner edge portion forming a close clearance with a radially projecting flange 65 on the turbine rotor end portion 49. Also secured to an intermediate portion of frame member 30 is a second ring member 66 provided with a plurality of circumferentially spaced axially extending guide blades 67. Spaced around the frame member 30 are a plurality of openings 68 which provide access from the annular chamber 60 to the cooling air fan inlet defined by shroud 64, ring 66, and the guide blades 67. Secured to the turbine rotor portion 29 by any suitable means are a plurality of circumferentially spaced axial flow fan blades 69 having tip portions forming a small radial clearance with the inner circumference of shroud ring 66 and adapted to draw air in through the openings 60, past the guide blades 67, and to discharge this cooling air into an annular discharge passage 70 defined by an inwardly projecting wall 71 formed integral with the end ring 33. Adjacent the end ring 33, frame member 30 is provided with a circumferential row of spaced openings 72, through one of which projects the inlet end of an "impact tube" 73, which is arranged to catch some of the air discharged from fan blades 69 and to deliver it under pressure to the chamber 63 of the labyrinth seal casing 61. This portion of the air is divided at the labyrinth seal 62a, part of it flowing to the left as indicated by the arrow 74, so as to cool the exhaust side of bucket-wheel 55. This wheel cooling air is discharged into the main turbine flow path as indicated by the arrow 75. The remaining openings 72 and the frame member 30 serve as discharge ports for the rest of the cooling air from fan 69. To prevent recirculation of cooling air from the discharge ports 72 back into the inlet ports 66, the conical baffle 59 is secured from the frame member 30 to the inner surface of the exhaust casing wall 23. This baffle directs the air discharged through ports 72 to the outlet opening indicated at 29. Thence, the spent cooling fluid is discharged through the passage defined by the curved vane 28b and the exhaust casing wall portion 24c.

The complete circuit for this cooling air flow will now be apparent. Fan blades 69 effect a circulation of air in through the cooling shroud inlet 57, through the openings in the main support rings 14, 15, 18a, 18b, 21, etc., thence through the strut cooling shrouds 27 into the space 60, thence through ports 68 to the fan inlet guide vanes 67. The cooling air is discharged through ports 72 and the opening 29 into the exhaust casing, where it mixes with the turbine discharge fluid.

While it is possible to use high pressure air from the compressor for performing all the turbine wheel cooling functions, it is to be noted that this high pressure air is "expensive" in terms of the power taken from the main rotor to supply it. An improvement in over-all thermal efficiency is obtained if the comparatively low pressure air for cooling and sealing the discharge side of the last-stage bucket-wheel is furnished by a separate axial flow fan such as the blower 69.

While the air discharged into the spaces adjacent the bucket-wheel serves to cool the turbine rotor, it should also be noted that this air may serve another important function, as follows. In high temperature turbines of the type described, there is at least some tendency for hot motive fluid to leak from the main flow path into the clearance spaces defined between the bucket-wheels and adjacent casing structure. This high temperature leakage flow may cause serious overheating; but, by introducing cooling air in the manner described above, the space adjacent the bucket-wheel is "pressurized" with comparatively cooler air, thereby resisting the tendency for hot fluid to leak into these spaces.

From the above description of the exhaust casing and the main framework with its cooling system, it will be apparent that the exhaust casing is supported at a radially outer circumference adjacent the last-stage bucket-wheel, where it is secured to the frame ring 21, being also supported at a radially inner circumference axially spaced from the second-stage bucket-wheel, where it is supported by baffle 59 from the main frame member 30. Frame member 30 is rigidly supported from the frame ring 21 by the air-cooled struts 26, which framework remains of substantially constant dimensions during operation, while the exhaust casing must be free to readily expand and contract relative to this cool framework when subjected to the high temperature exhaust fluid. Therefore, the entire exhaust casing, comprising walls 22, 23, 24, 24a, 24b, 24c, is fabricated of relatively thin sheet steel which will readily change dimension and deflect as necessary to compensate for differential thermal expansion between the exhaust casing and the cooled supporting framework thereof. This arrangement, by which the casing is carried by the frame ring 21 and the inner frame member 30, readily permits such differential thermal expansion without disruptive stresses being created in the casing or distortion produced in the main framework. Thus, it will be seen that the flow path is formed by comparatively thin flexible sheets, which are free to heat and cool rapidly and to deflect readily under the influence of differential expansion, while the main load-carrying support members are kept cool and out of contact with the hot fluid, and thus free from distortion and other troubles incident to high temperature operation.

The construction of the main framework and its special cooling system as described above insures that the principal load-carrying members will remain comparatively cool and, therefore, will not change dimensions materially as operating temperatures vary in the hot parts carried by the frame. Because the temperature of these load-carrying members (struts 17, rings 15, 21, members 30, 26, etc.) is maintained at a comparatively low value, they may all be fabricated of ordinary mild steel, which is cheap, easily obtainable, and readily worked and welded. This has the additional very great advantage of decreasing the changes in the dimensions of the main frame members as operating temperatures change, by reason of the lower coefficient of expansion of mild steel, as compared with that of the available high temperature resisting metals.

Those hot parts of the powerplant which do need to be fabricated of high temperature stainless steels, for instance, the combustor liners, nozzle blades, interstage diaphragm blades, etc., are all supported from the cooled framework by means which permit free differential thermal expansion therebetween.

In brief, throughout the design of this powerplant, the "load-carrying" function has been separated from the "hot fluid conducting" function, the former being performed by frame and casing members which are adapted to remain sufficiently cool that they can be made of ordinary low-temperature metals, while the latter function is performed by parts made of high-temperature metals flexibly supported from the cooler frame parts. This arrangement greatly simplifies the serious problems of maintaining proper bearing alignment and the clearances required between the various rotor components and associated stator and casing members.

It will be apparent to those skilled in the art that, while a preferred form of this cooled turbine frame structure has been described herein, many of the details may be modified in various ways without departing from the invention; and it is intended to cover by the appended claims all such modifications as fall within the true scope of the invention.

What we claim as new and desire to secure by Letters Patent of the United States is:

1. In a high temperature gas turbine powerplant, the combination of a first substantially cylindrical frame member, first bearing means supported from said frame member adjacent one end thereof, a plurality of circumferentially spaced combustors disposed around and supported in radially spaced relation from said frame member, a nozzle ring assembly, means supporting the nozzle ring coaxial with and radially spaced from the bearing end of said first frame member, walls forming transition ducts for leading hot motive fluid from the combustors to the nozzle ring, a first main frame ring coaxial with and substantially in the plane of the nozzle ring, a plurality of circumferentially spaced struts each having an inner end portion secured to the first frame member at a location remote from said first bearing and extending diagonally outward between adjacent combustors with an outer end portion secured to the first main frame ring, an interstage turbine casing divided into at least two portions along axial planes and secured together at said planes, said casing having an annular flange at either end including a first flange secured to the first main frame ring, a second main frame ring secured to the second flange, a turbine exhaust casing located immediately adjacent and secured to the second frame ring and forming an annular turbine discharge passage, a second axially extending frame member of substantially circular cross section arranged within the turbine exhaust casing, second bearing means secured to the exterior end of said second frame member, a plurality of circumferentially spaced struts connected at one end to the second main frame ring and extending axially and radially inward through the turbine discharge passage and having inner end portions connected to said second frame member, a cooling shroud surrounding each of the last-named struts and connected at either end to the exhaust casing to define a cooling air passage surrounding the strut, a turbine rotor supported in said first and second bearing means and having a first bucket-wheel located substantially in the plane of the first main frame ring with a circumferential row of buckets adapted to receive motive fluid from the nozzle ring and a second bucket-wheel arranged substantially in the plane of the second main frame ring and in series flow relation with the first wheel, said rotor having a portion forming a cooling blower impeller located within the second frame member, an external shroud extending from the exhaust casing and closely surrounding the first and second main frame rings, said shroud, frame rings, second frame member, and exhaust casing defining passages whereby said blower draws cooling air, through the frame rings and strut cooling passages and discharges spent cooling fluid into the exhaust casing.

2. In a high temperature powerplant having a turbine rotor with at least one axial flow bucket-wheel, the combination of first bearing means for the inlet end of the rotor, a frame with means for supporting the inlet end bearing; said frame including also a continuous main frame ring located substantially in the plane of the last-stage bucket-wheel, a turbine exhaust casing supported by said ring and defining an annular discharge passage for the bucket-wheel, an axially extending frame member of substantially circular cross section arranged within the exhaust casing, second bearing means for the discharge end of the rotor supported by the exterior end of said frame member, a plurality of circumferentially spaced struts connected at one end to the main frame ring and extending axially and radially inward through the turbine discharge passage and having inner end portions connected to said frame member, a cooling shroud surrounding each of the struts and connected at either end to the exhaust casing to define a cooling air passage surrounding the strut, walls defining an annular cooling chamber surrounding the rotor at the downstream side of the bucket-wheel, means on the turbine rotor forming a cooling blower impeller located within said frame member, an external shroud extending from the exhaust casing and closely surrounding the main frame ring, said frame ring and frame member and exhaust casing defining passages whereby the blower draws cooling air through the frame ring and strut cooling passages and discharges said cooling fluid into the exhaust casing, and conduit means for delivering a portion of the fluid discharged by the cooling blower to said chamber for cooling the exhaust side of the bucket-wheel and pressurizing the space adjacent the bucket-wheel web to resist the circulation of hot motive fluid thereinto.

3. In a high temperature powerplant having a turbine rotor with at least one axial flow bucket-wheel, the combination of a frame with bearing means for supporting the respective end portions of the rotor, said frame including a continuous main frame ring coaxial with the rotor and located substantially in the plane of the last-stage bucket-wheel, an exhaust casing supported by said ring and defining an annular discharge passage for the bucket-wheel, an axially extending member of substantially circular cross section arranged within the exhaust casing and having an exterior end portion adapted to support one of the rotor bearings, a plurality of circumferentially spaced struts connected at one end to the main frame ring and extending axially and radially inward through the turbine discharge passage and having inner end portions connected to said axially extending member, walls defining a cooling shroud surrounding each of the struts, each of said shrouds being connected at either end to the exhaust casing and spaced from the strut to define a cooling air passage surrounding the strut, an annular member surrounding the rotor within said axially extending member and spaced from the discharge side of the bucket-wheel to form a cooling air space therewith, labyrinth seal means carried by said annular member and forming close clearances with the rotor, means carried by the turbine rotor forming a cooling blower impeller located within said axially extending member and axially intermediate the cooling air chamber and the end bearing, said frame ring, exhaust casing, and inner axially extending member defining passages whereby the blower draws cooling air in contact with the main frame ring and through the strut cooling passages and discharges a portion of the cooling fluid into the exhaust casing, and conduit means for delivering a second portion of the fluid discharged by the cooling blower to an intermediate portion of said labyrinth seal whereby the seal member is cooled and cooling fluid escaping from the seal passes into said cooling chamber to cool the discharge side of the bucket-wheel and pressurize said chamber to resist the leakage of hot motive fluid thereinto.

4. In a high temperature turbine powerplant having a rotor with an axial flow bucket-wheel, the combination of a main frame including a continuous ring member surrounding and substantially in the plane of the bucket-wheel, an axially extending frame member of circular cross section arranged coaxial with the rotor and adjacent the discharge side of the bucket-wheel, bearing means for the rotor carried by said frame member, an exhaust casing having a radially outer end portion adjacent the bucket-wheel secured to the main frame ring and a second radially inner end portion secured to the axially extending frame member at a location remote from the bucket-wheel, the exhaust casing having walls defining an annular turbine discharge passage for the bucket-wheel and being fabricated of comparatively thin flexible sheets whereby the casing is free to change its dimensions and deflect as necessary to permit differential thermal expansion relative to the supporting frame, a plurality of circumferentially spaced struts each having a first end portion secured to the main frame ring and extending axially and radially inward through the turbine discharge passage and having a second end portion secured to the axially extending frame member, walls defining a cooling shroud surrounding each of the struts and spaced therefrom to form a cooling fluid passage, and means for circulating a cooling fluid through said passages to maintain the support struts at a comparatively low temperature whereby changes in the dimensions of the supporting frame during operation are minimized.

5. In a high temperature powerplant having a turbine rotor with at least one axial flow bucket-wheel, the combination of first bearing means for the inlet end of the rotor, a frame with means for supporting the inlet end bearing, said frame including also a continuous main frame ring located substantially in the plane of the last-stage bucket-wheel, a turbine exhaust casing supported by said ring and defining an annular discharge passage for the bucket-wheel, an axially extending frame member of substantially circular cross section arranged within the exhaust casing, a second bearing means for the discharge end of the rotor supported by the exterior end of said frame member, a plurality of circumferentially spaced struts connected at one end to the main frame ring and extending axially and radially inward through the turbine discharge passage and having inner end portions connected to said frame member, a cooling shroud surrounding each of the struts and connected at either end to the exhaust casing to define a cooling air passage surrounding the struts, means on the turbine rotor forming a cooling blower impeller located within said frame member, an external shroud extending from the exhaust casing and closely surrounding the main frame ring, said frame ring and frame member and exhaust casing defining passages whereby the blower draws cooling air through the frame ring and strut cooling passages and discharges said cooling fluid in the exhaust casing.

BRUCE O. BUCKLAND.
ALAN HOWARD.

No references cited.